(12) United States Patent
Lee et al.

(10) Patent No.: US 8,115,205 B2
(45) Date of Patent: Feb. 14, 2012

(54) ELECTROPHORETIC DISPLAY DEVICE AND METHOD OF MANUFACTURING AND REPAIRING THE SAME

(75) Inventors: Jea Gu Lee, Gumi-si (KR); Seung Chul Kang, Gumi-si (KR)

(73) Assignee: LG. Display Co. Ltd., Seoul (KR)

( * ) Notice: Subject to any disclaimer, the term of this patent is extended or adjusted under 35 U.S.C. 154(b) by 97 days.

(21) Appl. No.: 12/640,981

(22) Filed: Dec. 17, 2009

(65) Prior Publication Data
US 2010/0155734 A1 Jun. 24, 2010

(30) Foreign Application Priority Data
Dec. 24, 2008 (KR) .................. 10-2008-0133925

(51) Int. Cl.
*H01L 29/10* (2006.01)
(52) U.S. Cl. .................... 257/59; 257/57; 257/E27.141; 438/104; 349/55
(58) Field of Classification Search .................... 257/43, 257/57, 59, E27.13, E27.141; 438/104, 158
See application file for complete search history.

(56) References Cited

U.S. PATENT DOCUMENTS
5,435,608 A * 7/1995 Wei et al. .................... 257/59
* cited by examiner

*Primary Examiner* — Evan Pert
*Assistant Examiner* — Scott R Wilson
(74) *Attorney, Agent, or Firm* — Brinks Hofer Gilson & Lione

(57) ABSTRACT

Provided is an electrophoretic display device and a method of manufacturing and repairing the electrophoretic display device. The electrophoretic display device includes: a gate line, a gate electrode, and a common electrode, separated a predetermined distance from the gate line, which are formed on a substrate; a gate insulation layer formed on an overall surface of the substrate including the gate line; a data line configured to define a pixel area by crossing the gate line; a source electrode configured to extend from the data line; a drain electrode separated from a predetermined distance from the source electrode; a protection layer formed on an overall surface of the substrate including the data line, the source electrode, and the drain electrode; a pixel electrode formed on the protection layer and connected to the drain electrode; an electrophoretic film formed on the substrate including the pixel electrode; a common line formed on a boundary portion between the pixel areas and configured to connect the common electrodes formed in the respective pixel areas; and a repair hole formed by removing the protection layer corresponding to the common line to expose the gate insulation layer.

11 Claims, 5 Drawing Sheets

ELECTROPHORETIC DISPLAY DEVICE AND METHOD OF MANUFACTURING AND REPAIRING THE SAME

This application claims the benefit of Korea Patent Application No. 10-2008-0133925, filed on Dec. 24, 2008, the entire contents of which is incorporated herein by reference for all purposes as if fully set forth herein.

BACKGROUND

1. Field of the Invention

This disclosure relates to an electrophoretic display device (EPD) and a method of manufacturing and repairing the EPD, and more particularly to an EPD which can prevent generation of cracks in a protection layer during a repair process, and a method of manufacturing and repairing the EPD.

2. Discussion of the Related Art

In general, electrophoretic display devices (EPDs) are flat display devices using electrophoresis (a phenomenon that charged particles are moved toward anode or cathode in an electric field) and need no external light source, exhibit a superior reflection rate and superior flexibility and portability, and are light weight.

The EPD is a reflection type display, in which electrophoretic suspension particles are driven by coating a base film that is thin and easy to bend like paper or plastic, with a transparent conductive film. The EPD is expected to be highlighted as a next generation electric paper.

An EPD according to conventional technology is described with reference to FIG. 1A. FIG. 1A is a cross-sectional view schematically illustrating a conventional EPD.

Referring to FIG. 1A, a gate line (not shown) and a gate electrode 13a are formed on a substrate 11. A common electrode 15 is arranged by being separated from the gate line and in the same direction as the gate line. Then, a gate insulation layer 17 is formed on the substrate 11 on which the gate line and the gate electrode 13a are formed. A semiconductor pattern 19 is formed on the gate insulation layer 17 corresponding to the gate electrode 13a.

A data line 21 defining a pixel area P by crossing the gate line, a source electrode 21a extending from the data line 21, and a drain electrode 23 separated a predetermined distance from the source electrode 21a and simultaneously protruding toward the pixel area P are formed. The semiconductor pattern 19, the source electrode 21a, the drain electrode 23, and the gate electrode 13a constitute a thin film transistor (TFT) portion.

Next, a protection layer 25 is deposited on the overall surface of the substrate 11 where the source electrode 21a, the data line 21, and the drain electrode 23 are formed. Then, the protection layer 25 is selectively patterned to form a drain contact hole 27 that exposes the drain electrode 23. The protection layer 25 is formed by depositing an organic layer that is a low dielectric, for example, photoacrylate, on a structure in which the electrodes are overlapped with one another.

Then, a transparent electrode layer is deposited on the protection layer 25 including the drain contact hole 27 and patterned to form a pixel electrode 31. The pixel electrode 31 is connected to the drain electrode 23 via the drain contact hole 27. Also, the pixel electrode 31 is overlapped over the gate line and the data line 21 in the pixel area P where the gate line and the data line 21 are defined by crossing each other.

An electrophoretic film 33 is deposited on the substrate 11 including the pixel electrode 31. The electrophoretic film 33 includes a polymer binder and capsules 30 containing electric ink. The electronic ink within the capsule 30 includes white ink 33a and black ink 33b. Also, the white ink 33a and the black ink 33b distributed in the electrophoretic film 33, respectively, are charged into a positive charge and a negative charge.

A common line (not shown) is formed on the electrophoretic film 33 so that an EPD may be completed. The EPD is a reflection type display device and, to increase a reflectance, the pixel electrode 31 is formed to overlap over the gate line and the data line 21 in the pixel area P. As the pixel electrode 31 is overlapped with the gate line or the data line 21, capacitance generated therebetween increases which affects a driving voltage of the pixel electrode 31.

Thus, as the protection 25 located between the pixel electrode 31 and the gate line or the data line 21 is relatively thickly formed, signal interference between the pixel electrode 31 and the gate line or the data line 21 may be minimized.

When the common electrode 15 is disconnected, a repair process is performed. In the repair process, the common electrode 15 that is disconnected is cut off by emitting a laser beam onto the gate insulation layer 17 and the protection layer 25 corresponding to the common electrode 15. However, referring to FIG. 1B, when a laser beam is emitted in an area A of the protection layer 25 corresponding to the common electrode 15, due to the thickness of the protection layer 25, cracks may be generated in the protection layer 25 to which the laser beam is emitted so that the gate line and the data line 21 may be disconnected.

BRIEF SUMMARY

According to one general aspect of the present disclosure, an electrophoretic display device includes: a gate line, a gate electrode, and a common electrode, separated a predetermined distance from the gate line, which are formed on a substrate; a gate insulation layer formed on an overall surface of the substrate including the gate line; a data line configured to define a pixel area by crossing the gate line; a source electrode configured to extend from the data line; a drain electrode separated from a predetermined distance from the source electrode; a protection layer formed on an overall surface of the substrate including the data line, the source electrode, and the drain electrode; a pixel electrode formed on the protection layer and connected to the drain electrode; an electrophoretic film formed on the substrate including the pixel electrode; a common line formed on a boundary portion between the pixel areas and configured to connect the common electrodes formed in the respective pixel areas; and a repair hole formed by removing the protection layer corresponding to the common line to expose the gate insulation layer.

The repair hole is an area where a laser beam is emitted when the common electrode is discontinued.

The common electrode forms a storage capacitor by being overlapped with the drain electrode that protrudes toward a center portion of the pixel area.

The pixel electrode is overlapped over the gate line and the data line in the pixel area.

According to another general aspect of the present disclosure, a method of manufacturing an electrophoretic display device comprises forming a gate electrode, a gate line, a common line, and a common electrode on a first substrate; forming a gate insulation layer on an overall surface of the first substrate on which the gate electrode and the common electrode are formed; forming a semiconductor pattern, a source electrode, a drain electrode, and a data line on the gate insulation layer; forming a protection layer on the first substrate on which the source electrode and the drain electrode are formed; forming a drain contact hole, which exposes the drain electrode, by patterning the protection layer, and simultaneously forming a repair hole, which exposes the gate insulation layer, by removing the protection layer corresponding to the common line; and forming a pixel electrode which is electrically connected to the drain electrode.

The repair hole is an area where a laser beam is emitted when the common electrode is discontinued.

The common line is configured to connect the common electrodes formed at a center portion of each pixel area, and is formed at a boundary portion between the respective pixel areas.

According to another general aspect of the present disclosure, a method of repairing an electrophoretic display device, which includes a gate line, a gate electrode, and a common electrode, separated a predetermined distance from the gate line, which are formed on a substrate; a gate insulation layer formed on an overall surface of the substrate including the gate line; a data line configured to define a pixel area by crossing the gate line; a source electrode configured to extend from the data line; a drain electrode separated from a predetermined distance from the source electrode; a protection layer formed on an overall surface of the substrate including the data line, the source electrode, and the drain electrode; a pixel electrode formed on the protection layer and connected to the drain electrode; an electrophoretic film formed on the substrate including the pixel electrode; a common line formed on a boundary portion between the pixel areas and configured to connect the common electrodes formed in the respective pixel areas; and a repair hole formed by removing the protection layer corresponding to the common line to expose the gate insulation layer, the method comprising cutting the gate insulation layer and the common line by emitting a laser beam to the repair hole.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims. Nothing in this section should be taken as a limitation on those claims. Further aspects and advantages are discussed below in conjunction with the embodiments. It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the embodiments and are incorporated in and constitute a part of this application, illustrate embodiment(s) of the invention and together with the description serve to explain the disclosure. In the drawings.

DETAILED DESCRIPTION OF THE DRAWINGS AND THE PRESENTLY PREFERRED EMBODIMENTS

Figure 1A:
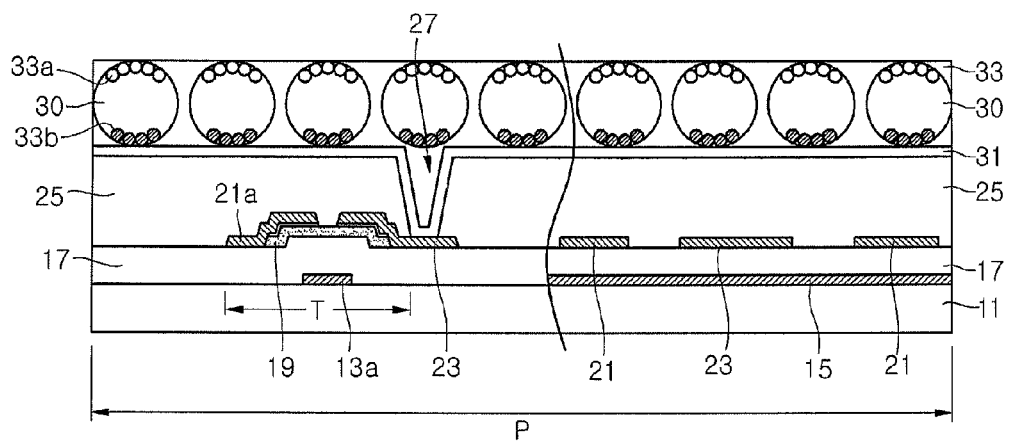
FIG. 1A is a cross-sectional view schematically illustrating a conventional EPD.
Figure 1B:
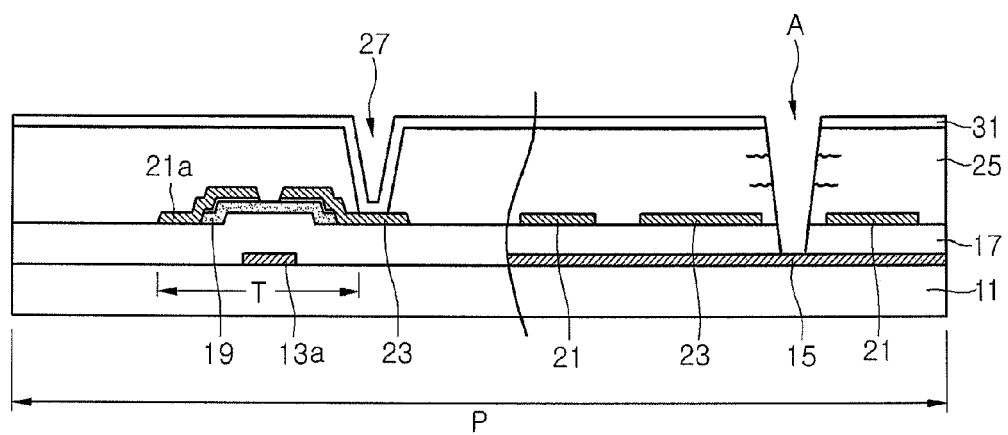
FIG. 1B is a cross-section view of the conventional EPD.

Reference will now be made in detail to the embodiments of the present disclosure, examples of which are illustrated in the accompanying drawings. These embodiments introduced hereinafter are provided as examples in order to convey their spirits to the ordinary skilled person in the art. Therefore, these embodiments might be embodied in a different shape, so are not limited to these embodiments described here. Also, the size and thickness of the device might be expressed to be exaggerated for the sake of convenience in the drawings. Wherever possible, the same reference numbers will be used throughout this disclosure including the drawings to refer to the same or like parts.

Figure 2:
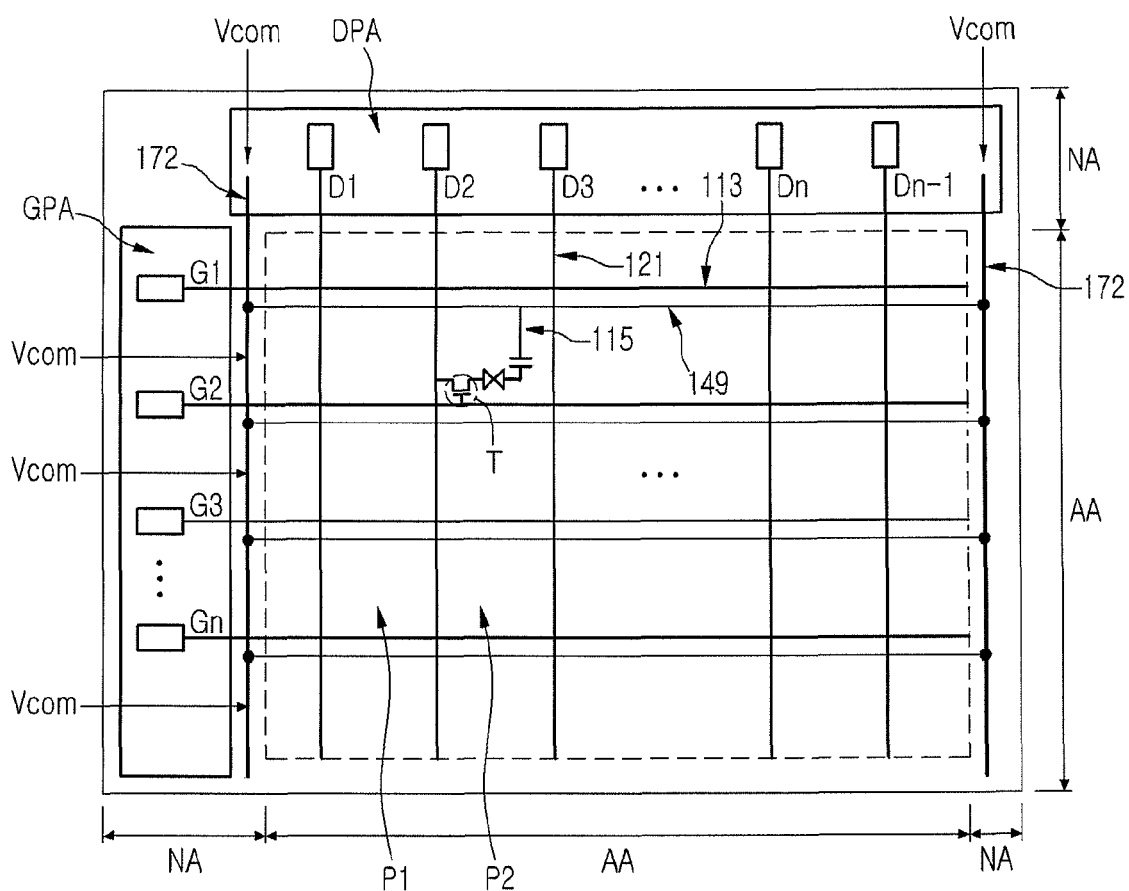
FIG. 2 is a plan view schematically illustrating an array substrate for an EPD according to an embodiment of the present disclosure.

FIG. 2 is a plan view schematically illustrating an array substrate for an EPD according to an embodiment of the present disclosure. Referring to FIG. 2, in a display area AA for displaying an image, a gate line 113 in a horizontal direction and a data line 121 in a vertical direction cross each other to define a pixel area P. In the pixel area P, a thin film transistor (TFT) T that is a switching element connected to the gate line 113 and the data line 121 is formed at a position where the gate line 113 and the data line 121 cross each other, and a pixel electrode (not shown) electrically connected to the T is formed.

A gate pad area (GPA) connected to the gate line 113 formed in the AA and to an external driving circuit (not shown) is formed at one side of a non-display area NA that is located outside the AA. A data pad area (DPA) connected to the data line 121 formed in the AA and to an external data driving circuit (not shown) is formed in the NA at the upper side of the AA.

A second common line 172 for applying a DC common voltage is formed at both side ends of the outside of the AA. The second common line 172 is connected to a first common line 149 that is parallel to the gate line 113. The second common line 172 applies an external DC common voltage from its both side ends located at both side ends of the DPA. The second common line 172 located in the NA at one side end of a substrate where the GPA is formed applies the external DC common voltage from a plurality of regions of the GPA. The application of the common voltage from both side ends through the second common line 172 is to prevent a difference in the applied voltage between the pixel area P formed close to the second common line 172 and the pixel area P located far from the second common line 172.

Also, since the common voltage is applied through the second common line 172 located at both side ends of the first common line 149, even when a disconnection is generated in a predetermined area of the first common line 149, the common voltage may be applied to the common electrode 115 in another pixel area P connected to the first common line 149.

The common electrode 115 formed in each pixel area P is connected to each other via the first common line 149. A repair hole (not shown) is further formed to correspond to the first common line 149 that is formed at a boundary portion of each pixel area P.

Figure 3A:
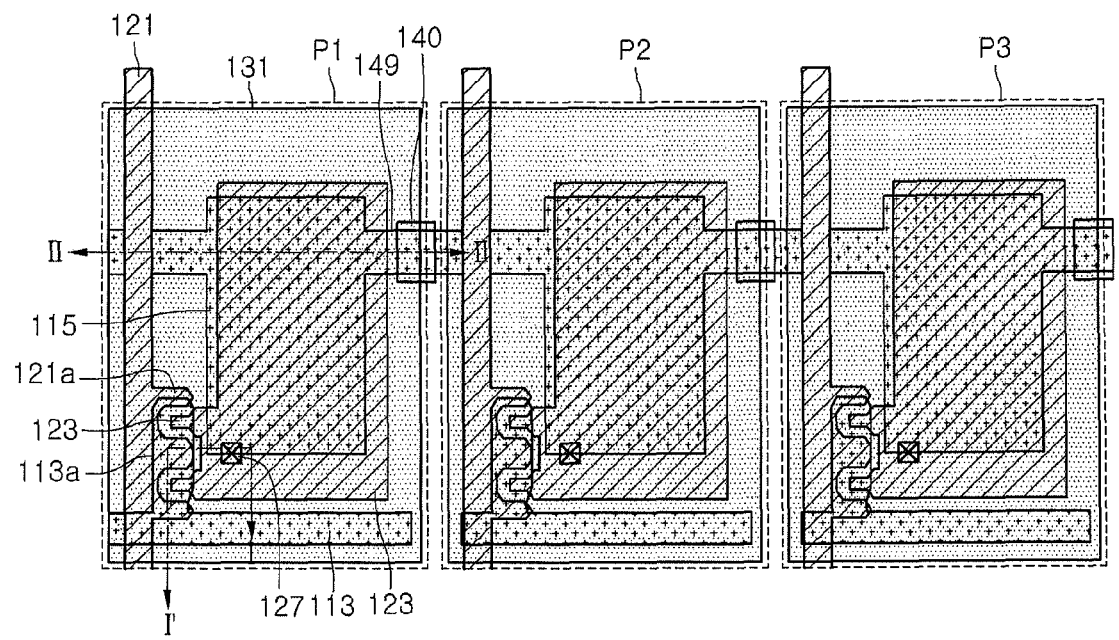
FIG. 3A is an enlarged plan view of adjacent pixel areas of the EPD of FIG. 2.
Figure 3B:
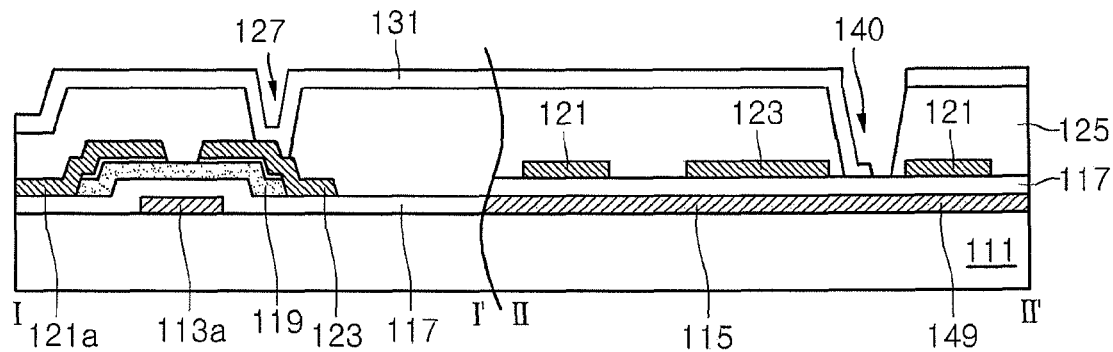
FIG. 3B is a cross-sectional view taken along lines I-I' and II-II' of FIG. 3A.

The pixel areas P of the array substrate for an EPD having the repair hole is described in detail. FIG. 3A is an enlarged plan view of adjacent pixel areas of the EPD of FIG. 2. FIG. 3B is a cross-sectional view taken along lines I-I' and II-II' of FIG. 3A.

Referring to FIGS. 3A and 3B, in a first pixel area P1, the gate line 113 is horizontally formed on a substrate 111. A gate electrode 113a extends from the gate line 113 toward the first pixel area P1. The common electrode 115 is separated from a predetermined distance from the gate line 113. The common electrode 115 is formed in the first pixel area P1 in a plate shape.

A gate insulation layer 117 is formed on the overall surface of the substrate 111 where the gate 113, the gate electrode 113a, and the common electrode 115 are formed. A semiconductor pattern 119 is formed on the gate insulation layer 117 corresponding to the gate electrode 113a.

The data line 121 is formed in a direction perpendicular to the gate line 113. A source electrode 121a extends from the data 121. A drain electrode 123 is separated a predetermined distance from the source electrode 121a.

The drain electrode 123 protrudes toward the center portion of the pixel area P to be overlapped with the common electrode 115 formed in a plate shape the pixel area P. Thus, the drain electrode 123 and the common electrode 115 work as a storage capacitor having the gate insulation layer 117 interposed therebetween. The source electrode 121a, the drain electrode 123, and the gate electrode 113a constitute a TFT portion.

Next, after a protection layer 125 is relatively thickly deposited on the overall surface of the substrate 111 where the source electrode 121a and the drain electrode 123 are formed, the protection layer 125 is selectively patterned, thereby forming a drain contact hole 127 which exposes the drain electrode 123.

The pixel electrode 131 is formed in the first pixel area P1 that is defined by the gate line 113 and the data line 121 which cross each other and is connected to the drain electrode 123 via the drain contact hole 127. The pixel electrode 131 is overlapped over the gate line 113 and the data line 121 in the first pixel area P1.

Also, the common electrode 115 having a plate shape and formed in one pixel area is connected to the common electrode 115 in an adjacent pixel area, via the first common line 149 illustrated in FIG. 2. Thus, since the first common 149 connecting the common electrodes 115 formed in the respective pixel areas is formed at a boundary portion between the pixel areas, a repair hole 140 is formed at the boundary portion between the pixel areas.

The repair hole 140 is an area to which a laser beam is emitted during a repair process when the common electrode 115 in a certain area is disconnected. In other words, when the common electrode 115 in a certain area is disconnected, the first common line 149 connected to the common electrode 115 of a corresponding pixel area is cut off in a repair process using a laser beam to prevent the supply of a common voltage to the corresponding pixel area. In doing so, the area to which the laser beam is emitted is the repair hole 140.

Figure 5:
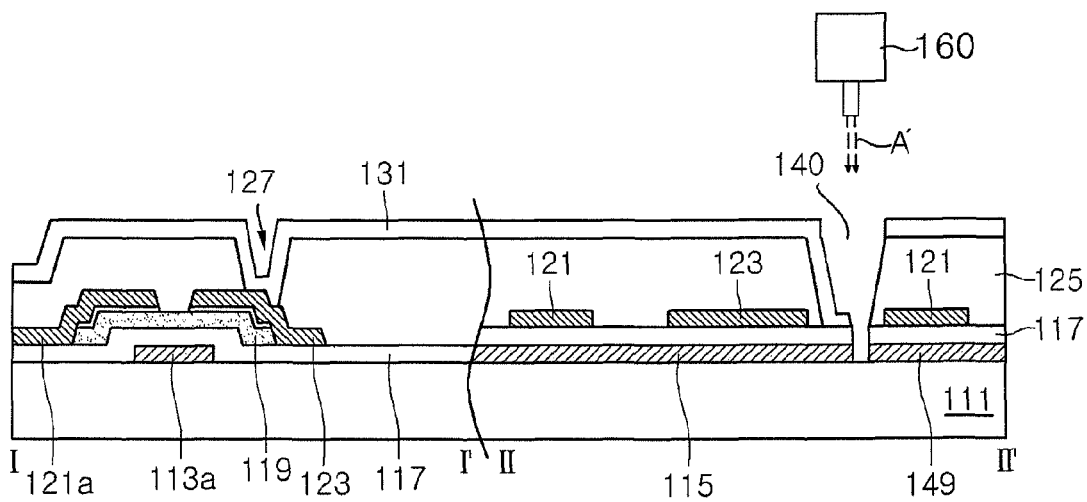
FIG. 5 is a cross-sectional view illustrating a method of repairing an EPD according to an embodiment of the present disclosure.

The repair hole 140 exposes the gate insulation layer 117 located under the protection layer 125 by removing the protection layer 125 corresponding to the first common line 149 that is formed at the boundary portion of the pixel areas. Thus, when the common electrode 114 in a certain area is disconnected, a laser beam A' of a laser irradiation device 160 is emitted to the repair hole 140 to cut off the first common line 149 connected to the common electrode 114, as illustrated in FIG. 5. Accordingly, since the protection layer 125 is already removed, the gate insulation layer 117 and the first common line 149 are cut off. Thus, the generation of cracks in the protection layer 125, which is caused by the laser beam emitted to cut the first common line 149, may be prevented.

A method of manufacturing an EPD in which the repair hole 140 is formed is described in detail with reference to FIGS. 4A-4D.

Figure 4A:
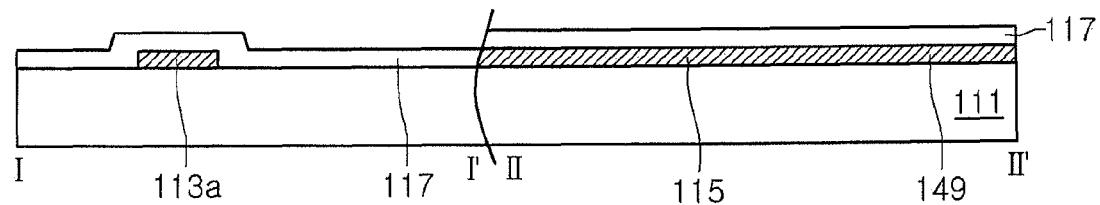
FIGS. 4A-4D illustrates a method of manufacturing an EPD according to an embodiment of the present disclosure.

Referring to FIG. 4A, after a conductive layer (not shown) for forming the gate line 113 of FIG. 3 is deposited on the substrate 111, the conductive layer is selectively patterned to form the gate electrode 113a and the gate line 113. During the patterning of the conductive layer, the common electrode 115 separated a predetermined distance from the gate line 113 and the first common line 149 connected to the common electrode 115 are simultaneously formed with the gate line 113. Next, the gate insulation layer 117 is formed on the substrate 111 on which the gate line 113, the gate electrode 113a, the common electrode 115, and the first common line 149 are formed.

Figure 4B:
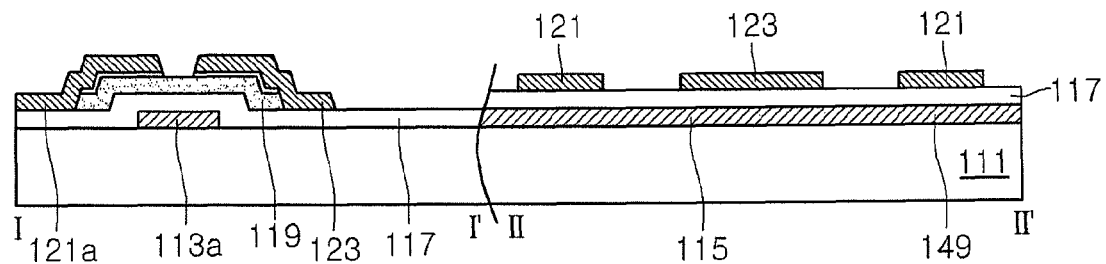

Referring to FIG. 4B, a semiconductor layer (not shown) and another conductive layer (not shown) are deposited on the substrate 111 on which the gate insulation layer 117 is formed. The semiconductor layer and the conductive layer area patterned to form the semiconductor pattern 119 and the data line 121. During the patterning of the conductive layer, the drain electrode 123 is formed to be separated a predetermined distance from the data line 121, with the data line 121. The source electrode 121a is formed to extent from the data line 121.

The drain electrode 123 protrudes toward the center portion of the pixel area. Accordingly, the drain electrode 123 overlaps the common electrode 115 formed at the center portion of the pixel area so as to work as a storage capacity with the gate insulation layer 117 interposed between the drain electrode 123 and the common electrode 115.

Figure 4C:
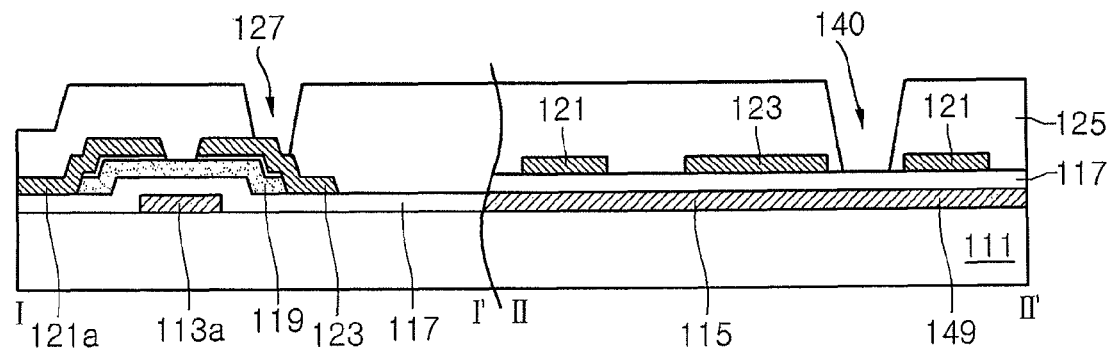

Referring to FIG. 4C, the protection layer 125 is deposited on the substrate 111 on which the data line 121, the drain electrode 123, and the source electrode 121a are formed. Then, the protection layer 125 is selectively patterned, thereby forming the drain contact hole 127 which exposes the drain electrode 123. During the patterning of the protection layer 125, with the formation of the drain contact hole 127, the repair hole 140 is formed by patterning the protection layer 125 to expose the gate insulation layer 117 corresponding to the first common line 149 which is formed at the boundary portion between the pixel areas.

Figure 4D:
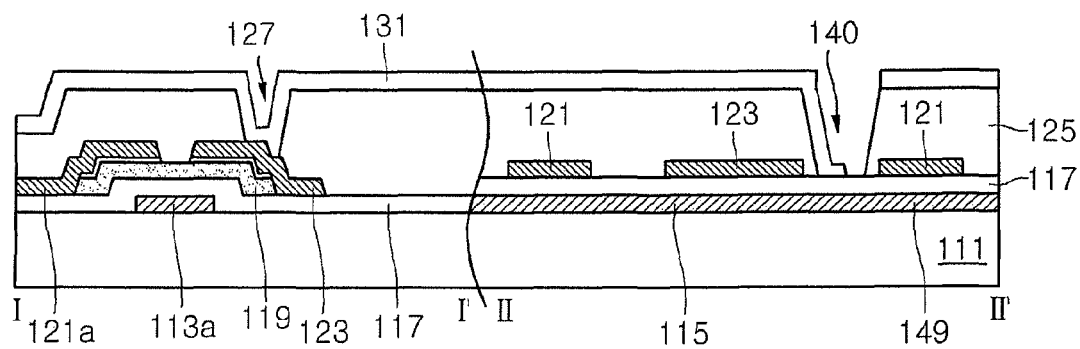

Referring to FIG. 4D, after a transparent electrode layer is deposited on the protection layer 125 including the drain contact hole 127 and the repair hole 140, the transparent electrode layer is patterned to form the pixel electrode 131, thereby completing the process. The pixel electrode 131 is connected to the drain electrode 123 via the drain contact hole 127.

As described above, since the EPD according to the present disclosure includes the repair hole through which a laser beam is emitted for a repair process, the generation of cracks in the protection layer formed above the common electrode may be prevented. Thus, the disconnection of the gate line and the data line may be prevented.

Although the present disclosure has been limitedly explained regarding only the embodiments described above, it should be understood by the ordinary skilled person in the art that the present disclosure is not limited to these embodiments, but rather that various changes or modifications thereof are possible without departing from the spirit of the present disclosure. Accordingly, the scope of the present disclosure shall be determined only by the appended claims and their equivalents.

The invention claimed is:

1. An electrophoretic display device comprising:
a gate line, a gate electrode, a common electrode and a common line on a substrate;
a gate insulation layer on the substrate including the gate line;
a data line formed to define a pixel area by crossing the gate line;
a thin film transistor corresponding to the pixel area, the thin film transistor including the gate electrode, a semiconductor layer, and source and drain electrode;
a protection layer on the substrate including the data line, the source electrode, and the drain electrode;
a pixel electrode on the protection layer and connected to the drain electrode;
an electrophoretic film on the substrate including the pixel electrode;
a common line on a boundary portion between the pixel areas and connected the common electrode formed in the pixel area; and
a repair hole formed by removing the protection layer corresponding to the common line to expose the gate insulation layer.

2. The electrophoretic display device claimed as claim 1, wherein the repair hole is a repair region where a laser beam is emitted when the common electrode is disconnected, and
wherein the laser beam is irradiated onto the gate insulating layer in the repair hole to remove the gate insulating layer and the common layer.

3. The electrophoretic display device claimed as claim 1, wherein the drain electrode protrudes toward a center portion of the pixel area to form a storage capacitor.

4. The electrophoretic display device claimed as claim 1, wherein the pixel electrode is overlapped over the gate line and the data line in the pixel area.

5. The electrophoretic display device claimed as claim 1, wherein the pixel electrode is formed in the repair hole.

6. A method of manufacturing an electrophoretic display device, the method comprising:
forming a gate electrode, a gate line, a common line, and a common electrode on a first substrate;
forming a gate insulation layer on the first substrate on which the gate electrode and the common electrode are formed;
forming a semiconductor pattern, a source electrode, a drain electrode, and a data line on the gate insulation layer;
forming a protection layer on the first substrate on which the source electrode and the drain electrode are formed;
forming a drain contact hole exposes the drain electrode by patterning the protection layer, and simultaneously forming a repair hole for exposing the gate insulation layer by removing the protection layer corresponding to the common line;
forming a pixel electrode which is electrically connected to the drain electrode; and
forming an electrophoretic film on the substrate including the pixel electrode.

7. The method claimed as claim 6, wherein the repair hole is an area where a laser beam is emitted when the common electrode is disconnected, and
wherein the laser beam is irradiated onto the gate insulating layer in the repair hole to remove the gate insulating layer and the common layer.

8. The method claimed as claim 6, wherein the common line is connected the common electrode formed at a center portion of each pixel area, and is formed at a boundary portion between the pixel areas.

9. A method of repairing an electrophoretic display device which includes: a gate line, a gate electrode, a common electrode and a common line, on a substrate; a gate insulation layer on the substrate including the gate line; a data line formed to define a pixel area by crossing the gate line; a thin film transistor corresponding to the pixel area, the thin film transistor including the gate electrode, a semiconductor layer, and source and drain electrode; a protection layer on the substrate including the data line, the source electrode, and the drain electrode; a pixel electrode on the protection layer and connected to the drain electrode; an electrophoretic film formed on the substrate including the pixel electrode; a common line on a boundary portion between the pixel areas and connected the common electrode formed in the pixel area; and a repair hole formed by removing the protection layer corresponding to the common line to expose the gate insulation layer,
cutting the gate insulation layer and the common line by irradiating the laser beam onto the gate insulating layer in the repair hole to remove the gate insulating layer and the common layer.

10. The method claimed as claim 9, wherein the repair hole is an area where a laser beam is emitted when the common electrode is disconnected.

11. The method claimed as claim 9, wherein the common line is connected the common electrode formed at a center portion of each pixel area, and is formed at a boundary portion between the pixel areas.

* * * * *